(12) United States Patent
Wetherill

(10) Patent No.: US 9,914,200 B2
(45) Date of Patent: Mar. 13, 2018

(54) MAGAZINE APPARATUSES FOR HOLDING GLASS ARTICLES DURING PROCESSING

(71) Applicant: Corning Incorporated, Corning, NY (US)

(72) Inventor: Todd Marshall Wetherill, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 100 days.

(21) Appl. No.: 14/808,702

(22) Filed: Jul. 24, 2015

(65) Prior Publication Data

US 2016/0039587 A1    Feb. 11, 2016

Related U.S. Application Data

(60) Provisional application No. 62/034,823, filed on Aug. 8, 2014.

(51) Int. Cl.
*B25B 11/00* (2006.01)
*C03C 21/00* (2006.01)
(Continued)

(52) U.S. Cl.
CPC ............ *B25B 11/00* (2013.01); *C03C 21/002* (2013.01); *C03C 23/0075* (2013.01); *B08B 9/42* (2013.01); *B08B 11/02* (2013.01); *B65D 5/48038* (2013.01)

(58) Field of Classification Search
CPC ... B25B 11/00; C03C 23/0075; C03C 21/002; B65D 5/48038; B65D 21/0212;
(Continued)

(56) References Cited

U.S. PATENT DOCUMENTS 355,997 A    1/1887    Joyce
390,735 A *  10/1888   Wieland ............. B65D 5/48038
                                               217/31
(Continued)

FOREIGN PATENT DOCUMENTS

CN    201641040 U    11/2010
DE     2255316 A1     5/1974
(Continued)

OTHER PUBLICATIONS

International Search Report & Written Opinion dated Oct. 29, 2015 for PCT/US2015/042012 dated Jul. 24, 2015. pp. 1-9.
(Continued)

*Primary Examiner* — Ko Hung Chan
(74) *Attorney, Agent, or Firm* — Dinsmore & Shohl LLP

(57) ABSTRACT

According to one embodiment, a magazine apparatus may include a plurality of dividing straps positioned substantially parallel with one another and a plurality of support straps positioned substantially parallel with one another. The plurality of support straps may intersect with the plurality of dividing straps to form a plurality of ware receiving channels. An upper end and a lower end of each ware receiving channel may be at least partially open. The magazine apparatus may also include a plurality of ware seats. Each ware seat may extend at least partially across a corresponding ware receiving channel proximate a lower end of the corresponding ware receiving channel. Each ware seat may provide a seat for glassware positioned in the corresponding ware receiving channel. A plurality of ware spacers may be positioned below and spaced apart from a corresponding ware seat and extending at least partially across the corresponding ware receiving channel.

20 Claims, 9 Drawing Sheets

(51) Int. Cl.
*C03C 23/00* (2006.01)
*B65D 5/49* (2006.01)
*B08B 9/42* (2006.01)
*B08B 11/02* (2006.01)

(58) Field of Classification Search
CPC .. B65D 71/0003; B65D 71/06; B65D 71/007; B08B 11/02; B08B 9/42; B08B 9/423
USPC .......................................................... 211/74
See application file for complete search history.

(56) References Cited

U.S. PATENT DOCUMENTS

| | | | |
|---|---|---|---|
| 431,862 A | 7/1890 | Abrams | |
| 463,604 A | 11/1891 | Iske | |
| 492,143 A | 2/1893 | Corely | |
| 659,328 A | 10/1900 | Strauss | |
| 664,475 A | 12/1900 | Graves | |
| 827,649 A | 7/1906 | Murphy | |
| 837,224 A | 11/1906 | Holcomb | |
| 898,007 A | 9/1908 | Rowe | |
| 1,079,789 A * | 11/1913 | Merker | B65D 5/48038 217/31 |
| 1,117,824 A | 11/1914 | Fleming | |
| 1,264,677 A | 4/1918 | Murrell | |
| 1,704,472 A | 3/1929 | Grandjean | |
| 1,744,054 A | 1/1930 | Mosgrove | |
| 1,798,779 A | 3/1931 | Bowersock | |
| 1,800,713 A | 4/1931 | Bowersock | |
| 1,828,837 A * | 10/1931 | Gagen | B65D 5/48038 206/433 |
| 1,980,930 A | 11/1934 | Reyniers | |
| 2,013,240 A * | 9/1935 | Harvey | B65D 5/48028 217/30 |
| 2,151,192 A | 3/1939 | Crosser | |
| 2,191,488 A | 2/1940 | McCowan | |
| 2,206,686 A | 7/1940 | Bauman | |
| 2,256,663 A | 9/1941 | Brewer | |
| 2,269,940 A | 1/1942 | Johnson | |
| 2,334,839 A | 11/1943 | Purchas | |
| 2,520,818 A | 8/1950 | Terry | |
| 2,545,416 A | 3/1951 | Staaf | |
| 2,615,749 A * | 10/1952 | Kuchel | B65D 71/0077 206/167 |
| 2,760,647 A | 8/1956 | Saul, Jr. | |
| 2,802,649 A | 8/1957 | Stockton | |
| 2,805,777 A | 9/1957 | Larson | |
| 2,916,156 A | 12/1959 | Larson | |
| 2,956,686 A | 10/1960 | Garey | |
| 2,979,246 A | 4/1961 | Liebeskind | |
| 3,187,902 A | 6/1965 | Nelson | |
| 3,370,696 A | 2/1968 | Groe | |
| 3,379,315 A | 4/1968 | Broadwin | |
| 3,590,752 A | 7/1971 | De Pew | |
| 3,590,863 A | 7/1971 | Faust et al. | |
| 3,613,897 A | 10/1971 | Filler | |
| 3,643,812 A | 2/1972 | Mander et al. | |
| 3,765,635 A | 10/1973 | Burrell et al. | |
| 3,768,709 A | 10/1973 | Kinard | |
| 3,780,972 A | 12/1973 | Brodersen | |
| 3,837,477 A | 9/1974 | Boudreau | |
| 4,040,234 A | 8/1977 | Stockdale et al. | |
| 4,068,798 A * | 1/1978 | Rohde | B01L 3/50825 211/74 |
| 4,182,455 A | 1/1980 | Zurawin | |
| 4,241,546 A | 12/1980 | Ilk | |
| 4,284,603 A | 8/1981 | Korom | |
| 4,285,449 A | 8/1981 | Campos | |
| 4,350,253 A | 9/1982 | Rusteberg | |
| 4,485,929 A | 12/1984 | Betts, Sr. | |
| 4,495,150 A | 1/1985 | Cook et al. | |
| 4,498,594 A | 2/1985 | Elder | |
| 4,534,465 A | 8/1985 | Rothermel et al. | |
| 4,583,647 A | 4/1986 | Schinzing | |
| 4,681,233 A | 7/1987 | Roth | |
| 4,793,548 A * | 12/1988 | Ross | B65D 5/48038 217/31 |
| 4,871,074 A | 10/1989 | Bryson et al. | |
| 4,923,669 A | 5/1990 | DeMario | |
| 4,963,493 A | 10/1990 | Daftsios | |
| 5,036,989 A | 8/1991 | Carilli | |
| 5,148,919 A | 9/1992 | Rubin | |
| 5,169,603 A | 12/1992 | Landsberger | |
| 5,279,428 A | 1/1994 | Lee | |
| 5,346,063 A | 9/1994 | Chow | |
| 5,360,309 A | 11/1994 | Ishiguro | |
| 5,375,716 A | 12/1994 | Rubin et al. | |
| 5,384,103 A | 1/1995 | Miller | |
| 5,451,380 A | 9/1995 | Zinnanti | |
| 5,492,671 A | 2/1996 | Krafft | |
| 5,505,316 A | 4/1996 | Lee | |
| 5,544,747 A | 8/1996 | Horn | |
| 5,558,246 A | 9/1996 | Ross, Jr. | |
| 5,570,863 A | 11/1996 | Cooper | |
| 5,624,032 A | 4/1997 | Yucknut et al. | |
| 5,785,239 A * | 7/1998 | Campbell, II | B65D 5/48038 217/22 |
| 5,797,675 A | 8/1998 | Tanner, Jr. | |
| 5,843,388 A | 12/1998 | Arroyo et al. | |
| 5,888,830 A | 3/1999 | Mohan et al. | |
| 5,893,457 A | 4/1999 | Wei | |
| 5,918,751 A | 7/1999 | Kelly | |
| 5,967,340 A | 10/1999 | Kao | |
| 5,984,293 A | 11/1999 | Abrahamson et al. | |
| 5,988,382 A | 11/1999 | Ritchie et al. | |
| 5,996,818 A | 12/1999 | Boje et al. | |
| 6,113,202 A | 9/2000 | Germano | |
| 6,132,684 A | 10/2000 | Marino | |
| 6,193,064 B1 | 2/2001 | Finneran | |
| 6,193,081 B1 | 2/2001 | Ewing | |
| 6,227,370 B1 * | 5/2001 | Earnshaw | B65D 5/001 206/497 |
| 6,230,888 B1 | 5/2001 | Frieze et al. | |
| 6,244,447 B1 | 6/2001 | Frieze et al. | |
| 6,257,409 B1 | 7/2001 | Lin | |
| 6,274,092 B1 | 8/2001 | Itoh | |
| 6,279,760 B1 | 8/2001 | Broeski | |
| 6,290,680 B1 | 9/2001 | Forsberg et al. | |
| 6,299,000 B1 | 10/2001 | Cabrera | |
| 6,343,690 B1 | 2/2002 | Britton et al. | |
| 6,345,723 B1 | 2/2002 | Blake et al. | |
| 6,354,543 B1 | 3/2002 | Paske | |
| 6,382,685 B1 | 5/2002 | Hammond | |
| 6,443,316 B1 | 9/2002 | Mao | |
| 6,481,583 B1 | 11/2002 | Black et al. | |
| 6,533,133 B2 | 3/2003 | Liu | |
| 6,568,544 B1 | 5/2003 | Lafond et al. | |
| 6,575,311 B1 | 6/2003 | Fink | |
| 6,640,981 B2 | 11/2003 | Lafond et al. | |
| 6,832,685 B2 | 12/2004 | Chang | |
| 6,971,506 B2 | 12/2005 | Hassinen et al. | |
| 7,152,837 B1 | 12/2006 | Babjak | |
| 7,213,592 B2 | 5/2007 | Fischhaber et al. | |
| 7,232,038 B2 | 6/2007 | Whitney | |
| 7,258,240 B2 | 8/2007 | Wescott, III | |
| 8,148,169 B2 | 4/2012 | Gjerde et al. | |
| 8,230,997 B1 | 7/2012 | McWilliams et al. | |
| D703,882 S | 4/2014 | Williams et al. | |
| 8,875,885 B2 | 11/2014 | Padden et al. | |
| 8,955,697 B2 | 2/2015 | Spilotro | |
| 9,403,270 B2 | 8/2016 | Lin | |
| 2002/0070185 A1 | 6/2002 | Chen | |
| 2002/0108917 A1 | 8/2002 | Maruyama | |
| 2004/0140277 A1 | 7/2004 | Comartin et al. | |
| 2005/0207945 A1 | 9/2005 | Itoh | |
| 2006/0027586 A1* | 2/2006 | Longhany | B65D 5/48038 220/676 |
| 2006/0198765 A1 | 9/2006 | Gjerde et al. | |
| 2007/0094924 A1 | 5/2007 | Wingerden | |
| 2008/0185352 A1 | 8/2008 | O'Hara | |
| 2010/0089938 A1 | 4/2010 | Motadel | |
| 2010/0163502 A1 | 7/2010 | Chang | |
| 2010/0258515 A1 | 10/2010 | Chen | |

(56) References Cited

U.S. PATENT DOCUMENTS

| | | |
|---|---|---|
| 2011/0084039 A1 | 4/2011 | Walters et al. |
| 2011/0113974 A1 | 5/2011 | D'Amato et al. |
| 2011/0132853 A1 | 6/2011 | Drobot et al. |
| 2011/0200500 A1 | 8/2011 | Feilders et al. |
| 2011/0240577 A1 | 10/2011 | Jones et al. |
| 2011/0293942 A1 | 12/2011 | Cornejo et al. |
| 2012/0037529 A1* | 2/2012 | Hall .................. B65D 5/48038 206/433 |
| 2012/0051987 A1 | 3/2012 | Johnson et al. |
| 2012/0085720 A1 | 4/2012 | Bettenhausen et al. |
| 2012/0292273 A1 | 11/2012 | Mcnamara |
| 2012/0305507 A1 | 12/2012 | Herchenbach et al. |
| 2013/0171456 A1 | 7/2013 | Fadeev et al. |
| 2013/0219965 A1 | 8/2013 | Allan et al. |
| 2013/0277322 A1 | 10/2013 | Tiberio |
| 2014/0014605 A1 | 1/2014 | Kilgore et al. |
| 2014/0093438 A1 | 4/2014 | Yanez et al. |
| 2014/0112845 A1 | 4/2014 | Edens et al. |
| 2014/0166520 A1 | 6/2014 | Hoppe et al. |
| 2014/0239022 A1 | 8/2014 | Dovell |
| 2014/0305825 A1 | 10/2014 | Holley, Jr. |
| 2014/0332428 A1 | 11/2014 | Holley, Jr. |
| 2014/0332429 A1 | 11/2014 | Boersma et al. |
| 2015/0001116 A1 | 1/2015 | Schmal et al. |
| 2015/0048091 A1 | 2/2015 | Chan et al. |
| 2015/0210457 A1 | 7/2015 | DiMauro |
| 2015/0246761 A1 | 9/2015 | Holley, Jr. et al. |
| 2016/0052125 A1 | 2/2016 | Steele et al. |
| 2016/0167041 A1 | 6/2016 | Curry et al. |

FOREIGN PATENT DOCUMENTS

| | | |
|---|---|---|
| DE | 2618522 A1 | 11/1977 |
| GB | 617777 A | 2/1949 |
| GB | 736837 A | 9/1955 |
| GB | 940041 A | 10/1963 |

OTHER PUBLICATIONS

International Search Report & Written Opinion dated Oct. 23, 2015 for PCT/US2015/042016 dated Jul. 24, 2015. pp. 1-9.
International Search Report & Written Opinion dated Nov. 2, 2015 for PCT/US2015/042033 dated Jul. 24, 2015. pp. 1-9.
International Search Report & Written Opinion dated Oct. 29, 2015 for PCT/US2015/042007 dated Jul. 24, 2015. pp. 1-9.
International Search Report & Written Opinion dated Aug. 30, 2016 for PCT/US2016/031647 dated May 10, 2016. pp. 1-12.
Notice of Allowance dated Sep. 14, 2016 for U.S. Appl. No. 14/808,728 filed Jul. 24, 2015. pp. 1-13.
Non-Final Office Action dated Feb. 23, 2017, for U.S. Appl. No. 14/808,734 filed Jul. 24, 2015. pp. 1-9.
Non-Final Office Action dated Mar. 28, 2017, for U.S. Appl. No. 14/808,710 filed Jul. 24, 2015. pp. 1-10.
Final Office Action dated May 25, 2017, for U.S. Appl. No. 14/808,734 filed Jul. 24, 2015. pp. 1-7.

* cited by examiner

MAGAZINE APPARATUSES FOR HOLDING GLASS ARTICLES DURING PROCESSING

CROSS REFERENCE TO RELATED APPLICATIONS

The present application claims priority to U.S. Provisional Patent Application No. 62/034,823 filed Aug. 8, 2014 entitled, "Magazine Apparatuses for Holding Glass Articles During Processing," the entirety of which is incorporated by reference herein.

BACKGROUND

Field

The present specification generally relates to magazine apparatuses for holding glass articles during processing and, more specifically, to magazine apparatuses for holding glass articles during ion exchange processing.

Technical Background

Historically, glass has been used as a preferred material for many applications, including food and beverage packaging, pharmaceutical packaging, kitchen and laboratory glassware, and windows or other architectural features, because of its hermeticity, optical clarity and excellent chemical durability relative to other materials.

However, use of glass for many applications is limited by the mechanical performance of the glass. In particular, glass breakage is a concern, particularly in the packaging of food, beverages, and pharmaceuticals. Breakage can be costly in the food, beverage, and pharmaceutical packaging industries because, for example, breakage within a filling line may require that neighboring unbroken containers be discarded as the containers may contain fragments from the broken container. Breakage may also require that the filling line be slowed or stopped, lowering production yields. Further, non-catastrophic breakage (i.e., when the glass cracks but does not break) may cause the contents of the glass package or container to lose their sterility which, in turn, may result in costly product recalls.

One root cause of glass breakage is the introduction of flaws in the surface of the glass as the glass is processed and/or during subsequent filling. These flaws may be introduced in the surface of the glass from a variety of sources including contact between adjacent pieces of glassware and contact between the glass and equipment, such as handling and/or filling equipment. Regardless of the source, the presence of these flaws may ultimately lead to glass breakage.

Accordingly, a need exists for alternative apparatuses for holding glass articles during processing to mitigate glass breakage.

SUMMARY

According to one embodiment, a magazine apparatus for holding and retaining glassware during processing may include a plurality of dividing straps positioned substantially parallel with one another and a plurality of support straps positioned substantially parallel with one another. The plurality of support straps may intersect with the plurality of dividing straps to form a plurality of ware receiving channels. An upper end and a lower end of each ware receiving channel may be at least partially open. The magazine apparatus may also include a plurality of ware seats. Each ware seat may extend at least partially across a corresponding ware receiving channel proximate a lower end of the corresponding ware receiving channel. Each ware seat may provide a seat for glassware positioned in the corresponding ware receiving channel. A plurality of ware spacers may be positioned below and spaced apart from a corresponding ware seat and extending at least partially across the corresponding ware receiving channel.

In another embodiment, a magazine apparatus for holding and retaining glassware during processing may include a plurality of dividing straps positioned substantially parallel with one another and a plurality of support straps positioned substantially parallel with one another. The plurality of support straps may intersect with the plurality of dividing straps to form a plurality of ware receiving channels. An upper end and a lower end of each ware receiving channel may be at least partially open. An outer wall may extend around the plurality of dividing straps and the plurality of support straps and the plurality of dividing straps and the plurality of support straps may be engaged with the outer wall. A plurality of ware seats may be positioned in and extend at least partially across a corresponding ware receiving channel proximate a lower end of the corresponding ware receiving channel. Each ware seat may provide a seat for glassware positioned in the corresponding ware receiving channel. A plurality of ware spacers may be positioned below and spaced apart from a corresponding ware seat and outside of the corresponding ware receiving channel, each ware spacer extending at least partially across the corresponding ware receiving channel.

Additional features and advantages of the apparatuses for holding and retaining glass articles during processing described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
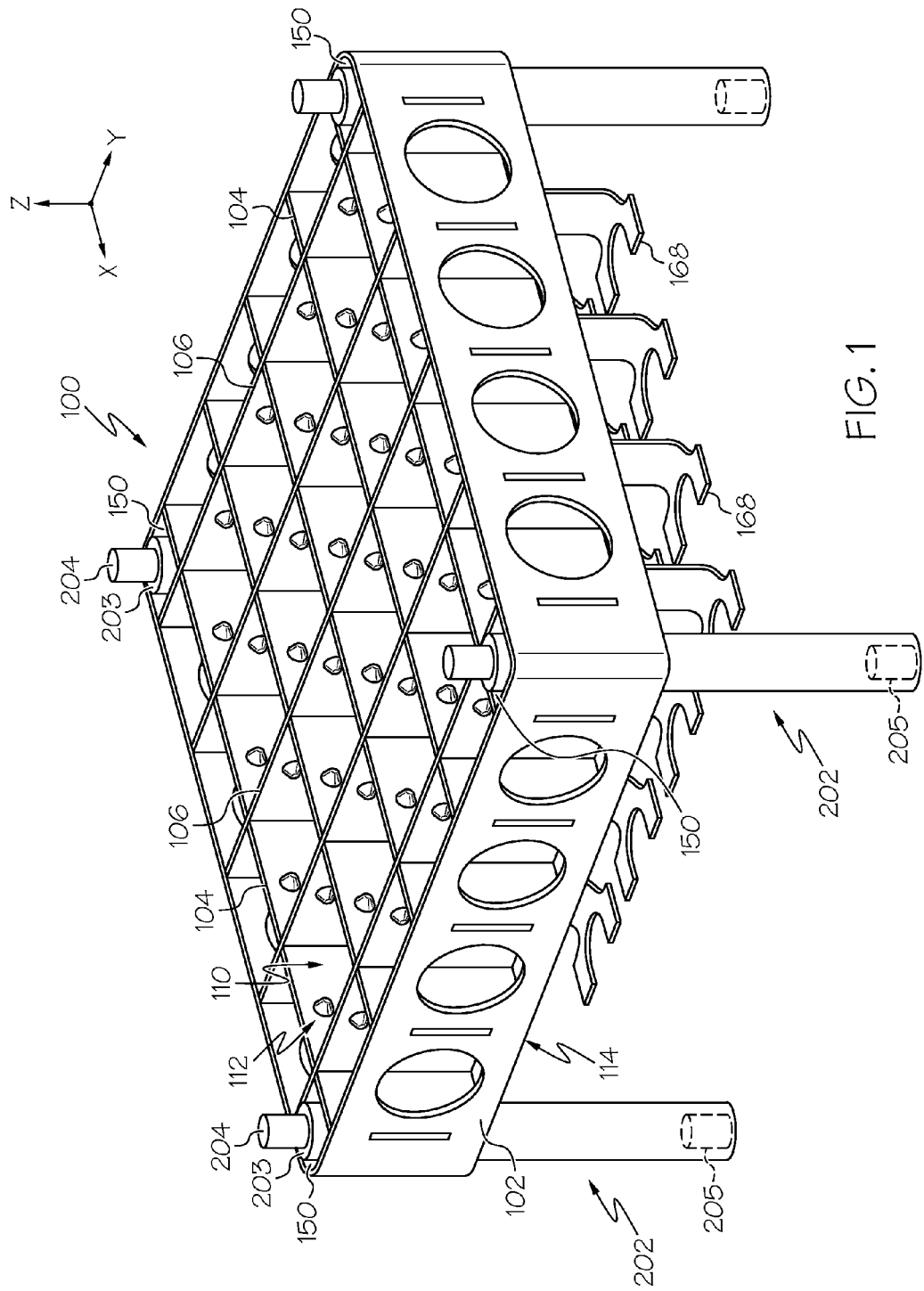
FIG. 1 schematically depicts a magazine apparatus for holding and retaining glass articles during processing according to one or more embodiments shown and described herein.
Figure 2:
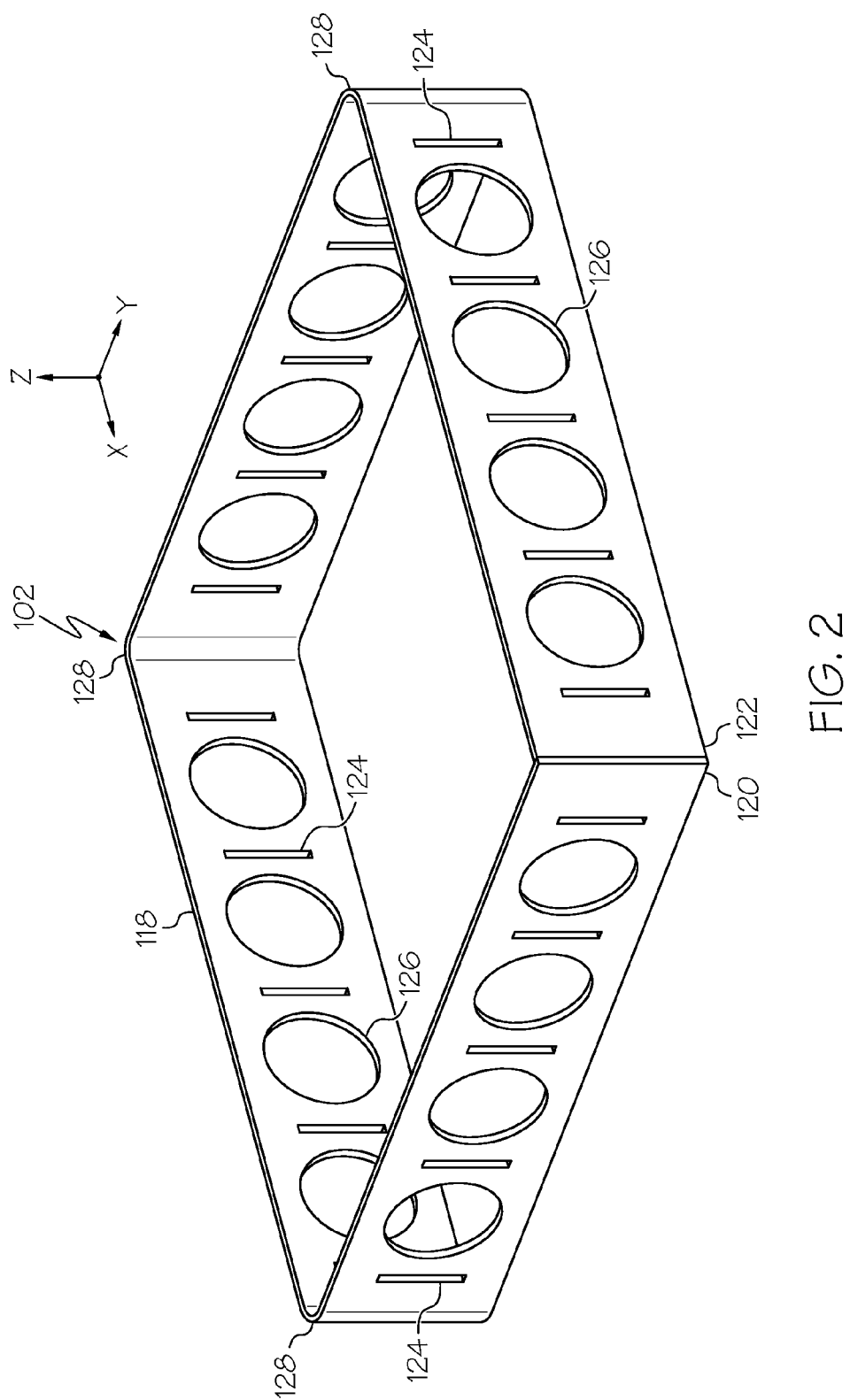
FIG. 2 schematically depicts an outer wall of the magazine apparatus of FIG. 1, according to one or more embodiments shown and described herein.

Reference will now be made in detail to embodiments of magazine apparatuses for holding and retaining glass articles during processing, examples of which are illustrated in the accompanying drawings. Whenever possible, the same reference numerals will be used throughout the drawings to refer to the same or like parts. One embodiment of an apparatus for holding and retaining glass articles during processing is schematically depicted in FIG. 1. The magazine apparatus generally comprises a plurality of dividing straps positioned substantially parallel with one another and a plurality of support straps positioned substantially parallel with one another. The plurality of support straps may intersect with the plurality of dividing straps to form a plurality of ware receiving channels. An upper end and a lower end of each ware receiving channel may be at least partially open. The magazine apparatus may also include a plurality of ware seats. Each ware seat may extend at least partially across a corresponding ware receiving channel proximate a lower end of the corresponding ware receiving channel. Each ware seat may provide a seat for glassware positioned in the corresponding ware receiving channel. A plurality of ware spacers may be positioned below and spaced apart from a corresponding ware seat and extending at least partially across the corresponding ware receiving channel. Various embodiments of apparatuses for holding and retaining glass articles during processing will be described in further detail herein with specific reference to the appended drawings.

As noted herein, the breakage of glass articles during processing and/or filling is a source of product loss and may lead to process inefficiencies and increased costs. Strengthening of glass articles can assist in mitigating breakage. Glass articles can be strengthened using a variety of techniques, including chemical and thermal tempering. For example, chemical tempering can be used to strengthen glass articles through the introduction of a layer of compressive stress in the surface of the glass articles. The compressive stress is introduced by submerging the glass articles in a molten salt bath. As ions from the glass are replaced by relatively larger ions from the molten salt, a compressive stress is induced in the surface of the glass. During chemical tempering, glass articles, such as glass containers, may be mechanically manipulated to both fill and empty the glass articles of molten salt.

While chemical tempering improves the strength of the glass articles, mechanical manipulation of the glass articles during the strengthening process may introduce flaws in the surface of the glass. For example, contact between the glass articles and the fixturing used to retain the glass articles during processing may introduce flaws in the glass, particularly when the glass articles and the fixturing are initially submerged in the molten salt bath and/or when the fixturing and glass articles are withdrawn from the molten salt bath and rotated to empty the glass articles of molten salt.

Specifically, the glass articles are initially placed in fixturing prior to being submerged in the molten salt bath. The fixturing is designed to retain a plurality of containers and may contain multiple trays of containers stacked on top of one another. Each container is generally held in an individual slot and retained in place with a collar situated about the neck or top of the glass articles. As the fixturing with the glass articles is submerged in the molten salt bath, the glass articles are initially positively buoyant which causes the glass articles to float upwards creating contact between the glass articles and the collar. This contact between the glass articles and the collar may introduce flaws into the surface of the glass. In addition, as the glass articles float upward, contact may occur between the top of the glass articles and the bottom of a tray stacked over the glass articles. This contact between the glass articles and the bottom of the tray stacked over the glass articles may be another source of flaws.

Moreover, after the ion exchange process is complete, the fixturing and glass articles are withdrawn from the molten salt bath and the fixturing is rotated to empty the glass articles of molten salt contained within the interior volume of the glass articles. As the fixturing is rotated, the glass articles may abruptly collide with the collar situated about the neck or top of the glass articles. This blunt force impact between the glass articles and the collar may introduce flaws in the surface of the glass.

In most cases the flaws are superficial and are contained within the layer of surface compressive stress induced in the glass. This surface compressive stress prevents the flaws from growing into cracks. However, in extreme cases, the flaws may extend through the layer of surface compressive stress which may lead to breakage of the glass articles.

In addition, fixturing used to hold and retain glass articles during ion exchange processing is typically formed from metallic materials in order to be able to withstand the high temperatures of the molten salt bath. Such fixturing can have a large thermal mass which can adversely impact the ion exchange process by altering the temperature of the molten salt bath. The fixturing also tends to have a large surface area which increases the contact between the fixturing and the molten salt which can cause the ions from the molten salt to diffuse into the fixturing, degrading process performance.

The magazine apparatuses for holding and retaining glass articles during processing described herein mitigate the introduction of flaws in the glass articles retained therein. The magazine apparatuses described herein are relatively low in weight and, as such, have a relatively low thermal mass which mitigates the degradation of ion exchange performance when the magazine apparatuses are used to facilitate strengthening of the glass articles contained therein by ion exchange.

It should be understood that the term "processing," as used herein, includes the treatment of glass articles contained within a magazine apparatus as well as the transport of glass articles while contained within the magazine apparatuses.

Referring now to FIG. 1, one embodiment of a magazine apparatus 100 for holding and retaining glass articles during processing is schematically depicted. The magazine apparatus 100 generally includes a plurality of dividing straps 104 and a plurality of support straps 106. The plurality of dividing straps 104 are generally positioned to be substantially parallel with one another. The plurality of support straps 106 are also arranged to be substantially parallel with one another and to intersect with the plurality of dividing straps 104 to form a plurality of ware receiving channels 110 in which individual glass articles (not shown), such as glass containers or the like, may be placed. In the embodiment shown in FIG. 1, the plurality of ware receiving channels 110 are arranged in a rectangular array, such as the square array depicted in FIG. 1. The ware receiving channels 110 have an upper end 112 and a lower end 114 which are at least partially open. For example, in the embodiment of the magazine apparatus 100 depicted in FIG. 1, the upper ends 112 of the ware receiving channels 110 are completely open while the lower ends 114 of the ware receiving channels are partially open. This allows for fluid, such as molten salt and/or water, to completely fill the ware receiving channels 110 when the magazine apparatus 100 is submerged in the fluid and also allows for the fluid to rapidly drain from the ware receiving channels 110 when the magazine apparatus 100 is withdrawn from the fluid.

In the embodiment of the magazine apparatus 100 depicted in FIG. 1, the ware receiving channels 110 are substantially square in cross section due to the relative positioning of the plurality of dividing straps 104 and the plurality of support straps 106. However, it should be understood that ware receiving channels with other cross sectional shapes are contemplated and possible. For example, the plurality of dividing straps 104 and the plurality of support straps 106 may be arranged relative to one another such that the ware receiving channels are rectangular in cross section or even rhomboidal in cross section. Ware receiving channels with different cross sectional areas may be used to accommodate glass articles of different form factors, such as round-form glass articles, rectangular-form glass articles, and the like.

In embodiments, the plurality of dividing straps 104 and the plurality of support straps 106 are constructed from a material suitable to withstand repeated cycling to high temperatures, such as the temperatures experienced in a conventional ion exchange operation (i.e., temperatures in excess of 300° C.), without loss of mechanical integrity. For example, in one embodiment, the plurality of support straps 106 and the plurality of dividing straps 104 are formed from a stainless steel material such as, for example 316L stainless steel, 304 stainless steel, 316 stainless steel and the like. In embodiments, the stainless steel materials may be plated or coated with a second material suitable for use at elevated temperatures including, without limitation, nickel or a nickel-based alloy.

In embodiments, the plurality of dividing straps 104 and the plurality of support straps 106 are constructed to minimize the thermal mass of the respective straps. For example, in embodiments, the plurality of dividing straps 104 and the plurality of support straps 106 may be constructed from thin sheets of material such that the straps have a thickness of less than or equal to 0.05 inch (1.27 mm) or even less than or equal to 0.03 inch (0.762 mm). In still other embodiments, the plurality of dividing straps 104 and the plurality of support straps 106 may be constructed from thin sheets of material such that the straps have a thickness of less than or equal to 0.02 inch (0.508 mm) or even less than or equal to 0.015 inch (0.381 mm). Forming the plurality of dividing straps 104 and the plurality of support straps 106 from thin sheets of material reduces the overall thermal mass of the magazine apparatus 100 while providing structural rigidity to the magazine apparatus 100. In general the plurality of dividing straps 104 and the plurality of support straps 106 are formed from metallic material in annealed condition in order to reduce dimensional variations and distortions upon exposure to elevated temperatures.

Figure 3:
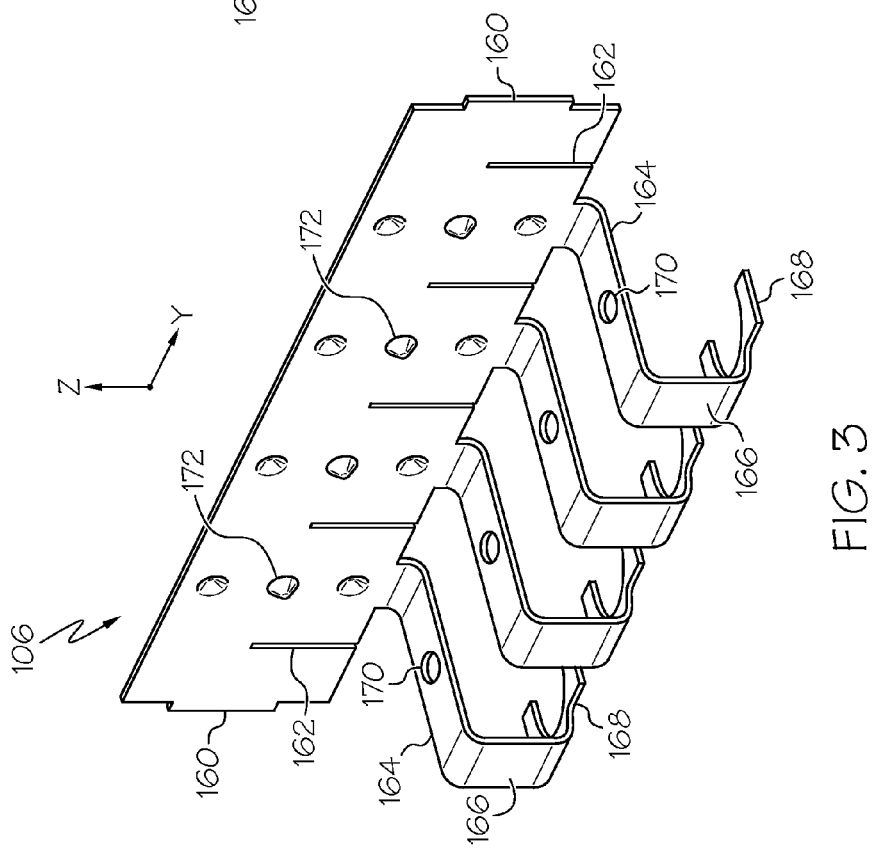
FIG. 3 schematically depicts a support strap of the magazine apparatus of FIG. 1 according to one or more embodiments shown and described herein.

Referring now to FIGS. 1 and 3, one exemplary embodiment of a support strap 106 is schematically depicted. As noted above, the support strap 106 is generally constructed from a thin sheet of material, such as a thin sheet of metallic material. In the embodiment of the support strap 106 depicted in FIG. 3, the support strap 106 includes a plurality of attachment slots 162 for engaging with a corresponding dividing strap 104 to fix the relative spacing and orientation of the support strap 106 and the corresponding dividing strap 104. The attachment slots 162 generally extend across a portion of the support strap 106 in a width direction of the support strap (i.e., in the z-direction of the coordinate axes shown in FIG. 3). In embodiments of the support strap 106 which include attachment slots 162, the attachment slots are spaced apart from one another at intervals which generally correspond to one desired dimension of the ware receiving channels 110 formed by the intersection of the dividing straps 104 with the support straps 106. In embodiments of the support strap 106 which include attachment slots 162, the attachment slots may be formed in the support strap 106 such that they are aligned with corresponding attachment slots 142 formed in the dividing straps 104 to which the support straps 106 are engaged.

Each of the support straps 106 is formed with a plurality of ware seats 164. The ware seats 164 act as seats for supporting glass articles retained within the ware receiving channels 110 of the magazine apparatus 100. The ware seats 164 are either attached to or integrally formed with the support straps 106 and are positioned on the support straps 106 such that the ware seats extend at least partially across a corresponding ware receiving channel 110 formed by the intersection of the support straps 106 and the dividing straps 104. For example, in embodiments where the support straps 106 are die-formed from a sheet of stock material, the ware seats 164 may be formed with the support strap 106 during the die-forming operation and, as such, are integrally formed with the support strap. Alternatively, the ware seats 164 may be constructed from a separate piece of material and joined to the support straps 106 by welding, brazing, mechanical fasteners or the like.

The cantilevered arrangement of the ware seats 164 on the support straps 106 facilitates constructing the ware seats 164 such that they are elastically deformable to deflect under an applied load, but sufficiently rigid to adequately support and retain glass articles within the ware receiving channels 110. In embodiments where the glass articles are glass containers, the ware seats 164 may be sufficiently rigid to adequately support and retain glass containers filled with a processing fluid, such as molten salt, water, or the like. The ware seats 164 may also be sufficiently compliant and elastically deformable such that the ware seats 164 flex when glass articles collide with the ware seat 164 (such as when a glass article is dropped or repositioned in the ware receiving channel), thereby preventing the glass article from being broken, cracked, or scratched. Said differently, the ware seats 164 are sufficiently compliant and elastically deformable such that the ware seats 164 cushion a glass article dropped or repositioned in the ware receiving channel, thereby preventing breakage. However, the ware seats 164 are also sufficiently rigid so that they do not elastically deform under the weight of a glass article positioned in the ware receiving channel 110, particularly under elevated temperature conditions.

It should be understood that the elasticity of the ware seats 164 may be controlled in a number of ways including, without limitation, reducing or increasing the thickness of the material from which the ware seats 164 are formed, changing the material from which the ware seats 164 are formed, or changing a geometry of the ware seats 164. It should also be understood that the desired elasticity of the ware seats 164 will depend upon the mass of the individual glass articles which the magazine apparatus 100 is intended to hold and that the elasticity of the ware seats 164 may be increased or decreased during design and construction of the magazine apparatus 100 to account for the mass of the individual glass articles which the magazine apparatus is intended to hold. In embodiments where the glass articles are glass containers, the elasticity of the ware seats 164 may be increased or decreased during design and construction of the magazine apparatus 100 to account for the mass of the glass container as well as the mass of any fluid contained in the glass container, such as molten salt, water, or the like.

In the embodiments described herein, the ware seats 164 are positioned on the support straps 106 such that the ware seats are located proximate a lower end of the ware receiving channels 110 formed by the intersection of the support straps 106 and the dividing straps 104. For example, in some embodiments, the ware seats 164 may be located within the corresponding ware receiving channels 110, just above the lower ends 114 of the ware receiving channel 110. In some other embodiments, the ware seats 164 may be located outside of the corresponding ware receiving channels 110, just below the lower ends 114 of the ware receiving channels. In still other embodiments, the ware seats 164 may be located at the lower ends 114 of the ware receiving channels 110, such that the upper surfaces of the ware seats 164 are flush with the lower end of the ware receiving channels.

In embodiments, the ware seats 164 may optionally include a seat aperture 170 which extends through the ware seats 164. The seat aperture 170 facilitates draining fluid, such as molten salt and/or water, that may accumulate on the ware seat 164 after the magazine has been removed from a molten salt and/or water bath. The seat apertures 170 also aid in reducing the thermal mass of the magazine apparatus 100.

Still referring to FIGS. 1 and 3, each of the support straps 106 also includes a plurality of ware spacers 168. In one embodiment (not shown) the ware spacers 168 extend directly from the support straps 106, such as when the ware spacers 168 are either attached to or integrally formed with the support straps 106. Alternatively, the ware spacers 168 may be attached to or integrally formed with the ware seats 164, as depicted in FIG. 3. For example, in the embodiment of the support strap 106 depicted in FIG. 3, the ware spacers 168 are integrally formed with the ware seats 164 and spaced apart from the ware seats 164 by spacer stems 166. The ware spacers act as spring cushions which slow and arrest the advance of glass articles from an adjacent magazine apparatus towards the underside of the magazine apparatus, thereby preventing damage to the glass articles.

The ware spacers 168 are generally located below the lower ends 114 and outside of the corresponding ware receiving channels 110 and below the corresponding ware seats 164. The ware spacers 168 are spaced apart from the corresponding ware seats 164 and generally extend at least partially across the lower end of the corresponding ware receiving channel 110. That is, the ware spacers 168 are cantilevered across at least a portion of the corresponding ware receiving channel 110. The cantilevered arrangement of the ware spacers 168 with respect to the corresponding ware receiving channels 110 facilitates constructing the ware spacers 168 such that they are elastically deformable and deflect under an applied load. For example, the ware spacers 168 may be sufficiently compliant and elastically deformable such that the ware spacers 168 flex when glass articles positioned in an adjacent magazine apparatus below the ware spacers 168 collide with the ware spacers 168 (such as when a stack of magazine apparatus are rotated for draining and/or submerged in a fluid), thereby preventing the glass articles located in an adjacent magazine apparatus from being broken, cracked, or scratched. Said differently, the ware spacers 168 are sufficiently compliant and elastically deformable such that the ware spacers 168 cushion a glass article which collides with the ware spacer.

It should be understood that the elasticity of the ware spacers 168 may be controlled in a number of ways including, without limitation, reducing or increasing the thickness of the material from which the ware spacers 168 are formed, changing the material from which the ware spacers 168 are formed, or changing a geometry of the ware spacers 168. It should also be understood that the desired elasticity of the ware spacers 168 will depend upon the mass and/or inertial mass of the individual glass articles which the magazine apparatus 100 is intended to hold and that the elasticity of the ware spacers 168 may be increased or decreased during design and construction of the magazine apparatus 100 to account for the mass or inertial mass of the individual glass articles which the magazine apparatus is intended to hold.

In embodiments, the support strap 106 may optionally include a plurality of projections which extend from the surface of the support strap 106. In the embodiment of the support strap 106 depicted in FIG. 3, the projections are hemispherical dimples 172. In embodiments, the dimples 172 are formed and spaced apart on the support strap 106 such that each ware receiving channel 110 bound by the support strap 106 has at least one dimple extending into the ware receiving channel 110 from the corresponding support strap. The dimples 172, when included, may assist in centering glass articles in the ware receiving channels 110 and spacing the glass articles apart from the support strap to maximize the contact between the glass article and fluid in which the magazine apparatus 100 is emerged. However, it should be understood that the dimples are optional and that, in some embodiments, the support strap 106 may be formed without dimples.

Figure 4:
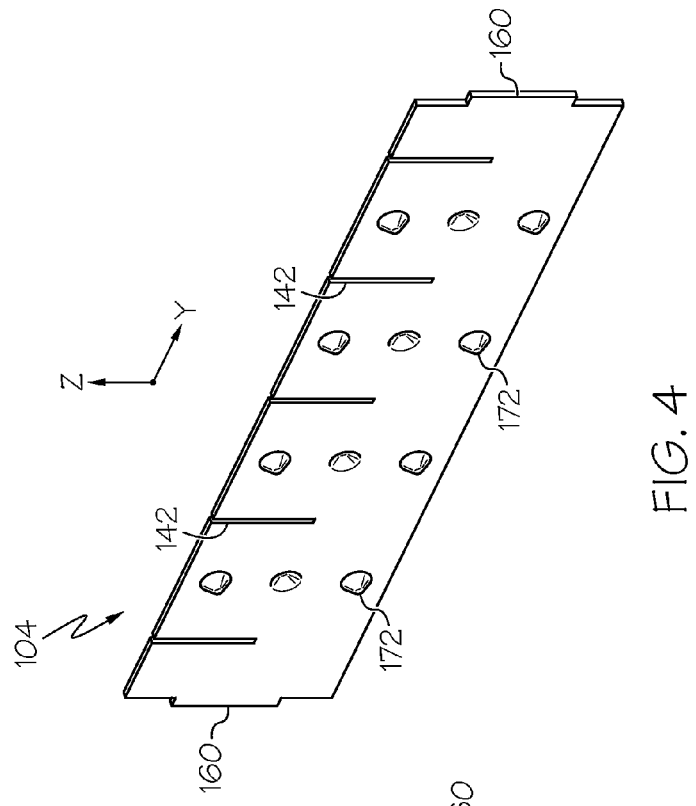
FIG. 4 schematically depicts a dividing strap of the magazine apparatus of FIG. 1 according to one or more embodiments shown and described herein.

Referring now to FIGS. 1 and 4, one exemplary embodiment of a dividing strap 104 is schematically depicted. As noted above, the dividing strap 104 is generally constructed from a thin sheet of material, such as a thin sheet of metallic material. In the embodiment of the dividing strap 104 depicted in FIG. 4, the dividing strap 104 includes a plurality of attachment slots 142 for engaging with a corresponding support strap 106 to fix the relative spacing and orientation of the dividing strap 104 and the corresponding support strap 106. The attachment slots 142 generally extend across a portion of the dividing strap 104 in a width direction (i.e., in the z-direction of the coordinate axes shown in FIG. 4). In embodiments of the dividing strap 104 which include attachment slots 142, the attachment slots are spaced apart from one another at intervals which generally correspond to one desired dimension of the ware receiving channels 110 formed by the intersection of the dividing straps 104 with the support straps 106. In embodiments of the dividing strap 104 which include attachment slots 142, the attachment slots may be formed in the dividing strap 104 such that they are aligned with corresponding attachment slots 162 formed in the support straps 106 to which the dividing straps 104 are engaged.

While the dividing strap 104 of FIG. 4 and the support strap 106 of FIG. 3 are depicted with attachment slots 142, 162, it should be understood that the attachment slots are optional and that, in some embodiments, each dividing strap 104 and/or the support strap 106 may be formed in discrete segments and individually connected together to corresponding dividing straps 104 and support straps 106 to form a plurality of ware receiving channels 110.

Referring again to FIG. 4, in embodiments, the dividing strap 104 may optionally include a plurality of projections which extend from the surface of the dividing strap 104. In the embodiment of the dividing strap 104 depicted in FIG. 4, the projections are hemispherical dimples 172. In embodiments, the dimples 172 are formed and spaced apart on the dividing strap 104 such that each ware receiving channel 110 bound by the dividing strap 104 has at least one dimple extending into the ware receiving channel 110 from the corresponding dividing strap. The dimples 172, when included, may assist in centering glass articles in the ware receiving channels 110 and spacing the glass articles apart from the dividing strap to maximize the contact between the glass article and fluid in which the magazine apparatus 100 is emerged. However, it should be understood that the dimples are optional and that, in some embodiments, the dividing strap 104 may be formed without dimples.

Referring now to FIGS. 1, 3 and 4, in embodiments, the array of ware receiving channels 110 is formed by first orienting the plurality of dividing straps 104 such that the dividing straps 104 are oriented substantially parallel with one another. A fixturing device may be used to temporarily hold the plurality of dividing straps 104 and maintain the relative spacing between adjacent dividing straps 104. Thereafter, the support straps 106 are coupled with the corresponding dividing straps 104 such that the attachment slots 162 of the support straps 106 are aligned and engaged with a corresponding portion of the dividing straps 104 below the attachment slots 142 of the dividing straps 104 and the attachment slots 142 of the dividing straps 104 engage with a corresponding portion of the support straps 106 above the attachment slots 162 of the support straps 106, thereby locking the support straps 106 to the dividing straps 104. Accordingly, it should be understood that, in embodiments, the attachment slots 162 of the support straps 106 and the dividing straps are aligned and engaged with one another. Thereafter, the support straps 106 and the dividing straps 104 may optionally be fastened together, such as by welding, brazing, or mechanical fasteners. For example, in one embodiment, the support straps 106 and the dividing straps 104 may be welded together at the points of intersection adjacent to the upper ends 112 of the ware receiving channels 110.

Figure 5:
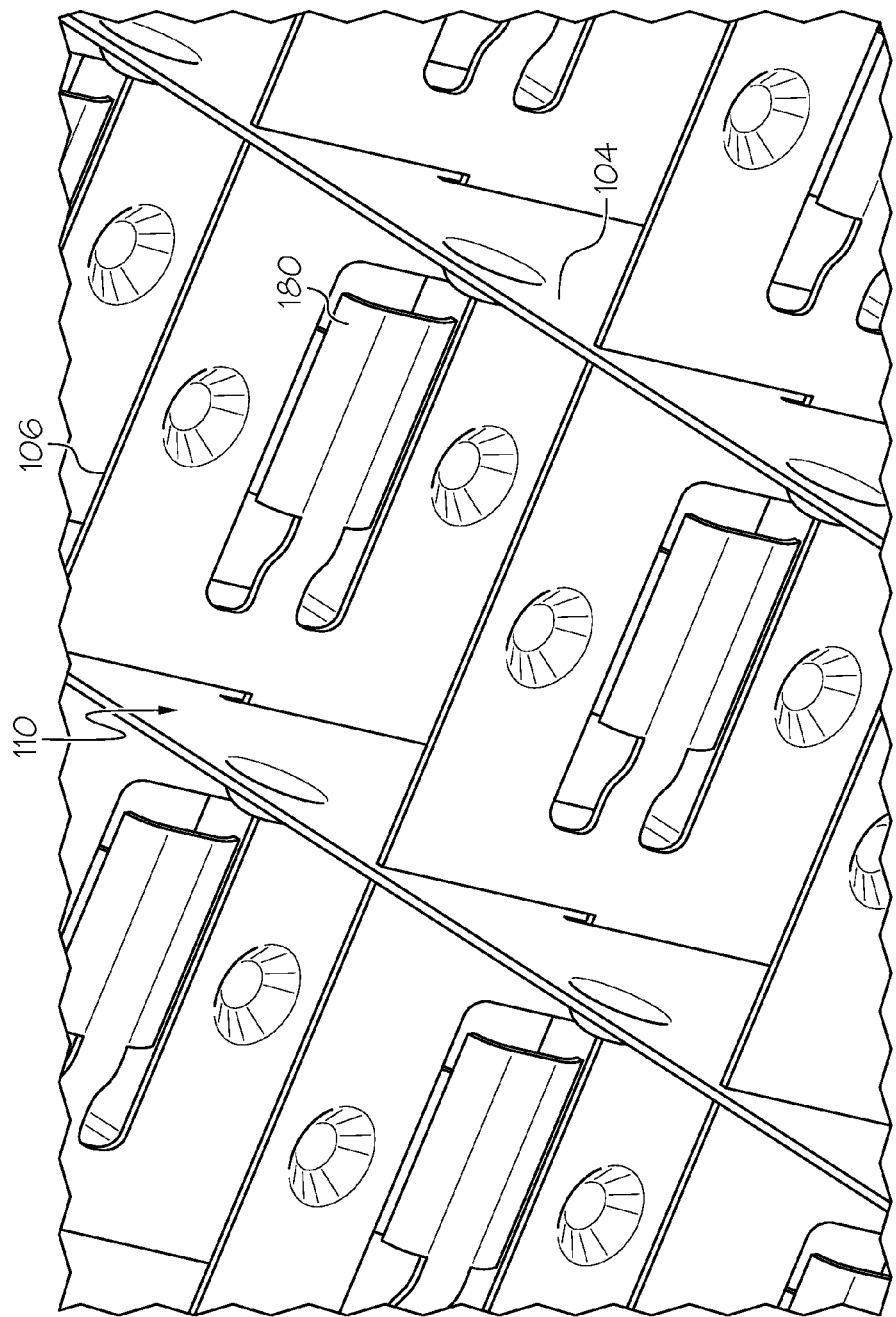
FIG. 5 schematically depicts one embodiment of a support strap with spring members formed therein according to one or more embodiments shown and described herein.

Referring now to FIG. 5, in some embodiments, the support straps 106 or the dividing straps 104 may optionally comprise a spring member 180. For example, FIG. 5 shows one embodiments in which the support straps 106 contain spring members 180. The spring members 180 are generally biased away from the support strap 106. Each support strap 106 may contain multiple spring members 180 with the spring members 180 being located such that the spring members are each biased into a corresponding ware receiving channel of the magazine apparatus 100. The spring members 180 may be sized and positioned to elastically engage with glass articles positioned in the ware receiving channels 110 to assist in retaining the glass articles in the ware receiving channels 110 as the magazine apparatus 100 is rotated or otherwise manipulated.

While FIG. 5 depicts the support straps 106 as comprising the spring members 180, it should be understood that other configurations are possible. For example, in embodiments, the spring members 180 may be associated with the dividing straps 104. In yet other embodiments, both the support straps 106 and the dividing straps 104 may have spring members 180 such that each ware receiving channel 110 has at least two spring members positioned in the channel.

In embodiments, the spring members 180 are integrally formed with the corresponding strap, such as when the spring members 180 are die cut or otherwise machined into the strap. However, in other embodiments, the spring members 180 may be separate parts or components joined to the corresponding strap, such as by welding, brazing, mechanical fasteners or the like.

Referring now to FIGS. 1-4, in embodiments, the magazine apparatus 100 may further comprise an outer wall 102 in which the plurality of dividing straps 104 and the plurality of support straps 106 are positioned. For example, in embodiments, the outer wall 102 extends around the plurality of dividing straps 104 and the plurality of support straps 106 and provides additional structural support to the plurality of ware receiving channels 110 formed by the intersection of the plurality of dividing straps 104 and the plurality of support straps 106. Similar to the plurality of dividing straps 104 and the plurality of support straps 106, the outer wall 102 may be constructed from a material suitable to withstand repeated cycling to high temperatures, such as the temperatures experienced in a conventional ion exchange operation (i.e., temperatures in excess of 300° C.), without loss of mechanical integrity. For example, in one embodiment, the outer wall is formed from a stainless steel material such as, for example 316L stainless steel, 304 stainless steel, 316 stainless steel, or the like. In embodiments, the stainless steel materials may be plated or coated with a second material suitable for use at elevated temperatures including, without limitation, nickel or a nickel-based alloy. In embodiments, the outer wall 102 is formed from the same material as the plurality of dividing straps 104 and the plurality of support straps 106. However, it should be understood that, in some other embodiments, the outer wall 102, the plurality of dividing straps 104 and the plurality of support straps may be formed from different materials.

As with the plurality of dividing straps 104 and the plurality of support straps 106, the outer wall 102 is constructed to minimize the thermal mass of the magazine apparatus. In embodiments, the outer wall 102 may be formed from a sheet of metallic material which is thicker that the materials from which the plurality of dividing straps 104 and the plurality of support straps 106 are formed from. In these embodiments, the outer wall 102 is thicker than the plurality of dividing straps 104 and the plurality of support straps 106 to provide structural rigidity to the plurality of ware receiving channels 110. For example, in some embodiments, the outer wall 102 has a thickness greater than about 0.02 inch (0.508 mm), such as about 0.03 inch (0.762 mm). In some embodiments, the outer wall 102 has a thickness greater than about 0.035 inch (0.889 mm), such as greater than or equal to about 0.04 inch (1.016 mm) or even greater than or equal to 0.05 inch (1.27 mm). However, it should be understood that, in other embodiments, the outer wall 102, the plurality of dividing straps 104 and the plurality of support straps 106, all have substantially the same thickness.

Still referring to FIGS. 1-4, in some embodiments the outer wall 102 is formed from a single strip of metallic material which is formed into the desired shape. For example, in embodiments, the outer wall is formed into a rectangular shape by imparting three 90 degree bends 128 in the material to form a closed loop. Optionally, the first end 120 and the second end 122 of the single strip of metallic material may be joined together, such as by welding or the like, to close the loop formed by the strip of metallic material. In other embodiments (not shown), the outer wall 102 may be formed into a rhomboidal shape by imparting a series of bends in the material to achieve the desired rhomboidal shape. In alternative embodiment (not shown), the outer wall 102 may be formed from a plurality of individual straps (e.g., one strap per side of the magazine apparatus) which are joined together by welding, brazing, fasteners, or the like. In embodiments where the outer wall of the magazine apparatus is constructed from individual straps of material, the individual straps may be joined at the corners of the magazine apparatus. For example, in some embodiments, the straps forming the outer wall may be joined to standoffs (discussed further herein) positioned at the corners of the magazine apparatus.

In embodiments, the outer wall 102 may optionally comprise one or more drain apertures 126 which extend through the thickness of the outer wall. The drain apertures 126 allow for fluid, such as molten salt and/or water, to completely fill the ware receiving channels 110 when the magazine apparatus 100 is submerged in the fluid and also allow for the fluid to rapidly drain from the ware receiving channels 110 when the magazine apparatus 100 is withdrawn from the fluid. In addition, the drain apertures 126 decrease the thermal mass of the magazine apparatus 100, lessening the thermal impact the magazine apparatus 100 has on the ion exchange bath as it is lowered into the bath.

In the embodiments described herein, the plurality of dividing straps 104 and the plurality of support straps 106 are engaged with the outer wall 102. In some embodiments, the end of each dividing strap 104 and the end of each support strap 106 is joined to the outer wall 102, such as by welding or the like. In some embodiments, the outer wall 102 includes a plurality of retention slots 124. In these embodiments, the each of the dividing straps 104 and the support straps 106 are formed with retention tabs 160 at either end of the respective straps 104, 106. The plurality of dividing straps 104 and the plurality of support straps 106 are arranged within the outer wall 102 such that the retention tabs 160 of the respective tabs 160 are aligned with and engaged with a corresponding retention slot 124 formed in the outer wall 102. In embodiments, the retention tabs 160 may be further welded into place once inserted in the corresponding retention slot 124.

While the embodiment of the magazine apparatus 100 depicted in FIG. 1 contains an outer wall 102, it should be understood that the outer wall 102 is optional and that, in other embodiments, the magazine apparatus 100 does not contain an outer wall 102, such as when the magazine apparatus 100 is constructed with only the plurality of dividing straps 104 and the plurality of support straps 106 forming the ware receiving channels 110.

Figure 6:
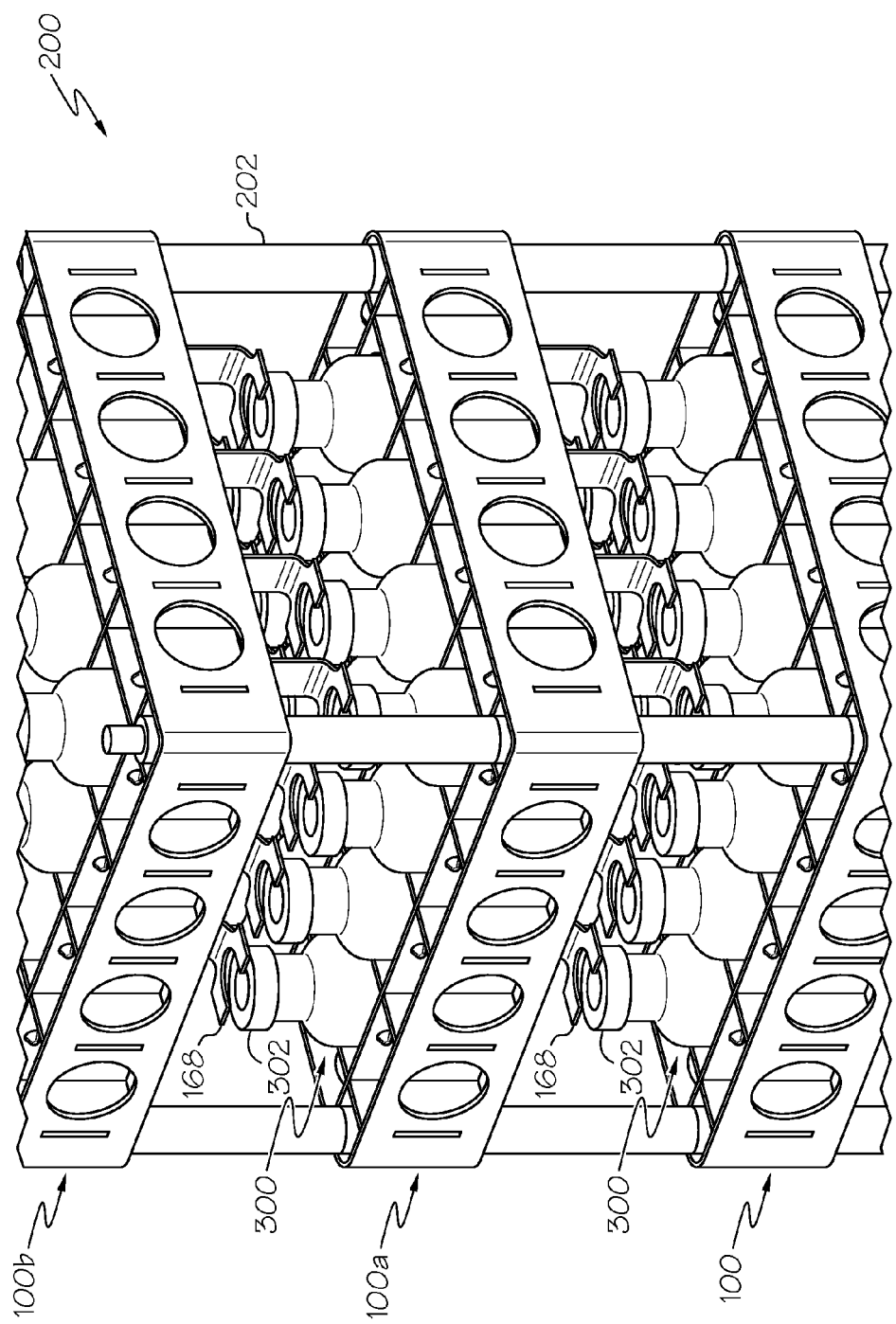
FIG. 6 schematically depicts a cassette comprising a plurality of magazine apparatuses.

Referring now to FIGS. 1 and 6, the magazine apparatus 100 may further comprises stacking channels 150 located in the corners of the magazine apparatus 100, adjacent to the ware receiving channels 110. In embodiment of the magazine apparatus 100 depicted in FIG. 1, the stacking channels 150 are formed by the intersection of the dividing straps 104 with the outer wall 102 and the intersection of the support straps 106 with the outer wall 102. Alternatively, in embodiments where the magazine apparatus 100 is formed without an outer wall 102, the stacking channels 150 may be formed by additional sheet material affixed to about the perimeter of the magazine apparatus 100. The stacking channels 150 facilitate stacking a plurality of magazine apparatuses one atop another, as depicted in FIG. 6. Specifically, standoffs 202 may be inserted in the stacking channels 150 of a first magazine apparatus 100a and joined to the outer 102 such as by welding, mechanical fasteners or the like. The upper end of each standoff 202 (i.e., the ends in the +z-direction of the coordinate axes depicted in FIG. 1) includes a pin 204 and a shoulder 203. The lower ends of each standoff 202 (i.e., the ends in the −z-direction of the coordinate axes depicted in FIG. 1) includes a bore 205 for receiving a pin of a corresponding standoff. When magazine apparatuses 100a, 100b are stacked one atop another, as depicted in FIG. 6, the pin 204 of a standoff 202 of a lower magazine apparatus 100a engages with a bore 205 of a standoff 202 of an upper magazine apparatus 100b and the standoffs 202 of the upper magazine apparatus 100b rest on the shoulders 203 of the standoffs of the lower magazine apparatus 100a. The standoffs 202 are sized such that the ware spacers 168 extending below the ware receiving channels 110 of the second magazine apparatus 100b are in close proximity with or even in contact with the upper portion 302 of glass articles 300 positioned in the ware receiving channels 110 of the first magazine apparatus 100a. This prevents the glass articles 300 from floating and/or sliding in the ware receiving channels 110 and having blunt force contact with the second magazine apparatus 100b when the first and second magazine apparatuses 100a, 100b are submerged and/or rotated to empty the glass articles 300 of fluid.

Figure 7:
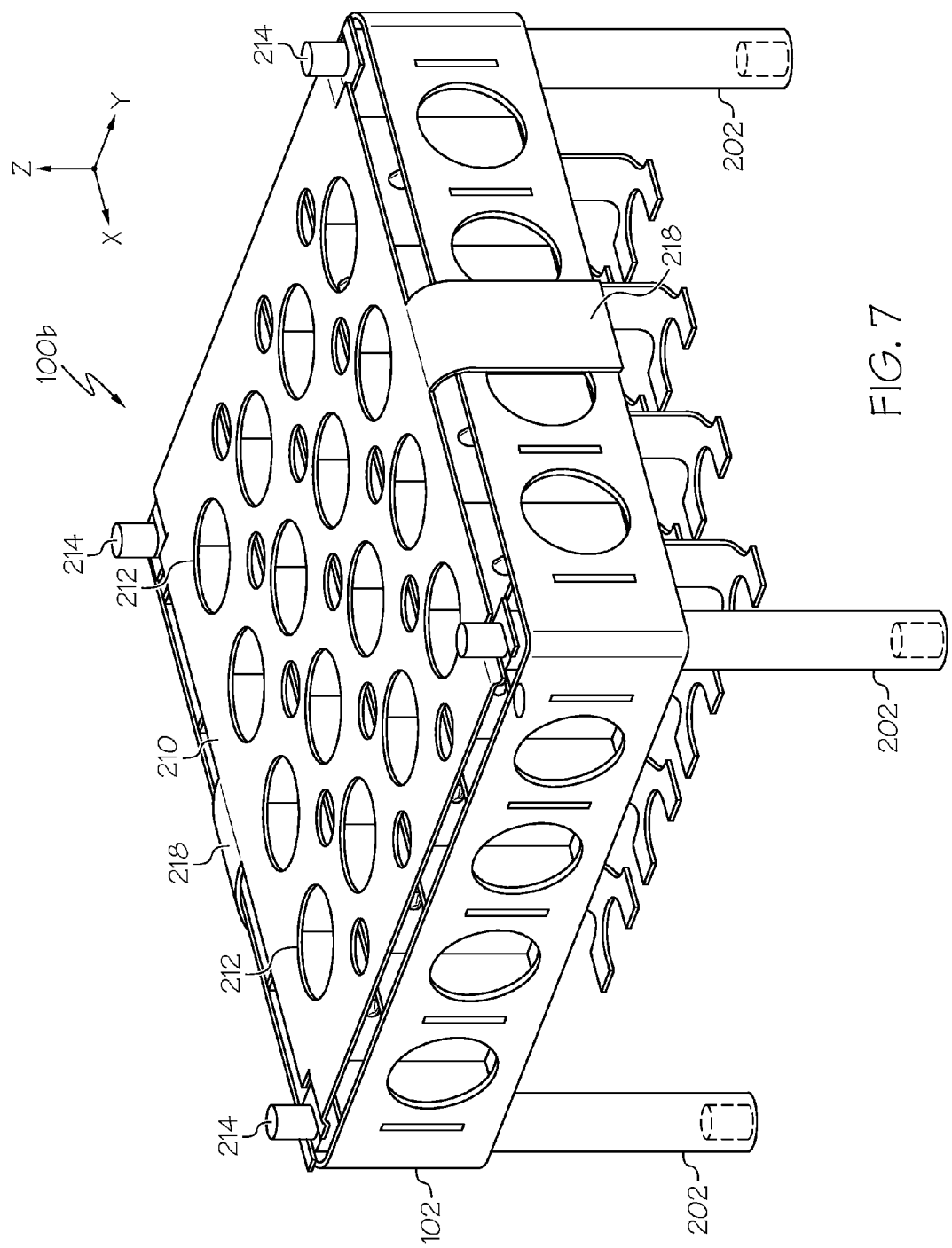
FIG. 7 schematically depicts a magazine apparatus with a cover plate attached thereto, according to one or more embodiments shown and described herein.

Referring now to FIGS. 6 and 7, in embodiments, the upper magazine apparatus 100b of a stack of magazine apparatuses may further comprise a cover plate 210 positioned over top of the magazine apparatus. The cover plate 210 holds glass articles in the ware receiving channels of the upper magazine apparatus 100b as the stack of magazine apparatuses are manipulated through various processing steps, such as ion exchange processing, washing, rinsing, and the like. The cover plate 210 is constructed from a material suitable to withstand repeated cycling to high temperatures, such as the temperatures experienced in a conventional ion exchange operation (i.e., temperatures in excess of 300° C.), without loss of mechanical integrity. For example, in one embodiment, the cover plate 210 may be formed from a stainless steel material such as, for example 316L stainless steel, 304 stainless steel, 316 stainless steel and the like. In embodiments, the stainless steel materials may be plated or coated with a second material suitable for use at elevated temperatures including, without limitation, nickel or a nickel-based alloy.

In embodiments, the cover plate 210 is constructed to minimize its thermal mass. For example, in embodiments, the cover plate 210 may be constructed from thin sheets of material such that the cover plate 210 has a thickness of less than or equal to 0.05 inch (1.27 mm) or even less than or equal to 0.03 inch (0.762 mm). In still other embodiments, the cover plate 210 may be constructed from a thin sheet of material such that the cover plate has a thickness of less than or equal to 0.02 inch (0.508 mm) or even less than or equal to 0.015 inch (0.381 mm). Forming cover plate 210 from a thin sheet of material reduces the overall thermal mass of the magazine apparatus 100 while providing structural rigidity to the magazine apparatus 100.

The cover plate 210 may include a plurality of openings 212 which extend through the thickness of the cover plate 210. The openings 212 allow for fluid, such as molten salt and/or water, to completely fill the ware receiving channels 110, and the glass articles positioned in the ware receiving channels 110, when the magazine apparatus 100b is submerged in the fluid. The openings 212 allow for the fluid to rapidly drain from the ware receiving channels 110 when the magazine apparatus 100b is withdrawn from the fluid. In addition, the openings decrease the thermal mass of the magazine apparatus 100b, lessening the thermal impact the magazine apparatus 100 has on the ion exchange bath as it is lowered into the bath. In embodiments, the openings 212 may be of uniform size and shape and are regularly positioned over the surface of the cover plate 210. In some other embodiments, the openings may be formed with different sizes and/or shapes.

In some embodiments, the cover plate 210 may include a plurality of locating channels 214. These locating channels 214 may be positioned to engage with the pins 204 of the standoffs 202 in order to properly orient the cover plate 210 on the magazine apparatus 100b. The cover plate 210 may also include an attachment clip 218 which engages with the magazine apparatus 100b to retain the cover plate 210 atop the magazine apparatus 100b. In embodiments, the attachment clip 218 may be an elastically deformable and recoverable clip attached to, or integrally formed with, the cover plate 210. The attachment clip 218 may engage with the outer wall 102 of the magazine apparatus, as depicted in FIG. 7, or, alternatively, with the support straps and/or divider straps of the magazine apparatus 100b.

Figure 10:
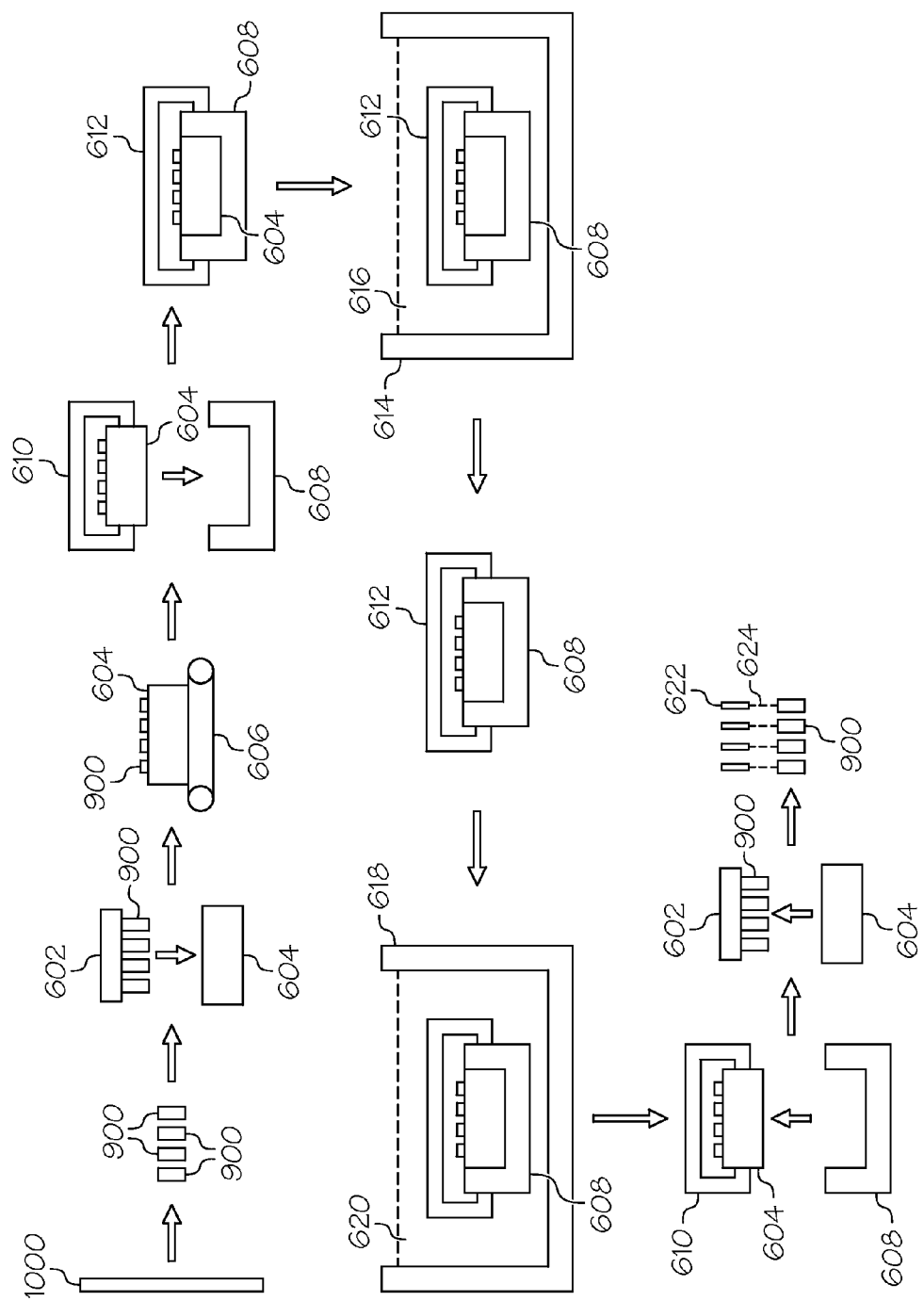
FIG. 10 schematically depicts the method steps of the flow diagram of FIG. 9.

Referring collectively to FIGS. 1 and 6-10, FIG. 9 contains a process flow diagram 500 of a method for strengthening glass articles by ion exchange and FIG. 10 schematically depicts the process described in the flow diagram. In a first step 502, glass tube stock 1000 formed from an ion-exchangeable glass composition is initially shaped into a glass article 300 (specifically glass vials in the embodiment depicted) using conventional shaping and forming techniques. In step 504, the glass articles 300 are loaded into magazine apparatuses 100 using a mechanical magazine loader 602. The magazine loader 602 may be a mechanical gripping device, such as a caliper or the like, which is capable of gripping multiple glass articles at one time. Alternatively, the gripping device may utilize a vacuum system to grip the glass articles 300. The magazine loader 602 may be coupled to a robotic arm or other, similar device capable of positioning the magazine loader 602 with respect to the glass articles 300 and the magazine apparatus 100. The magazine loader 602 positions individual glass articles 300 in the ware receiving channels 110 of each magazine apparatus 100 such that the glass articles are positioned on the ware seats 164.

Figure 8:
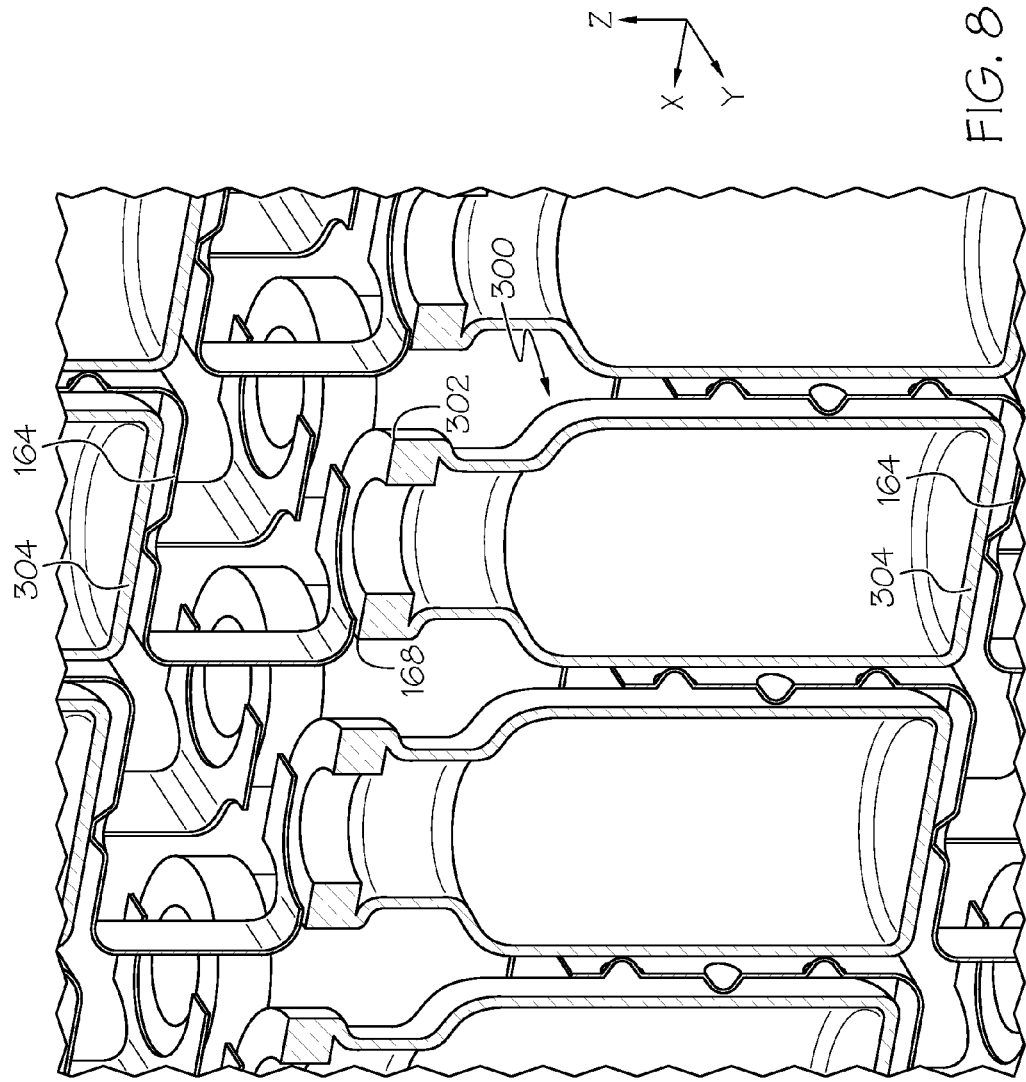
FIG. 8 schematically depicts a partial cross section of the cassette of FIG. 6 showing glass articles positioned in the ware receiving channels of the magazine apparatuses.
Figure 9:
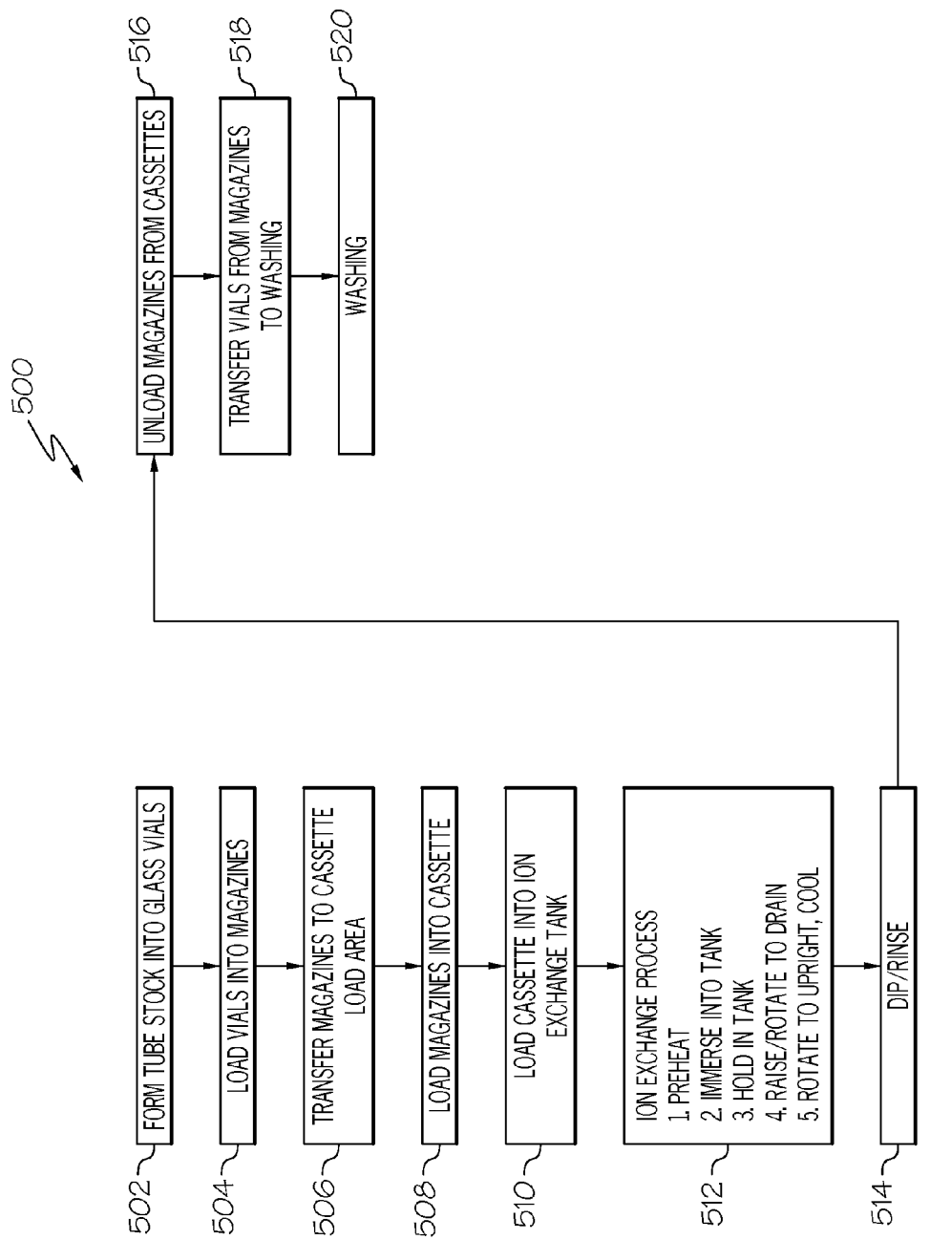
FIG. 9 is a flow diagram of a method for ion exchange strengthening glass articles with the magazine apparatuses described herein.

In a next step 506, the magazine apparatus 100 loaded with the glass articles 300 is transferred with a mechanical conveyor, such as a conveyor belt 606, overhead crane or the like, to a cassette loading area. Thereafter, in step 508, a plurality of magazine apparatuses 100 (one depicted) are loaded into a cassette 608. While only one magazine apparatus 100 is depicted in FIG. 10, it should be understood that the cassette 608 is constructed to hold a plurality of magazine apparatuses such that a large number of glass articles can be processed simultaneously. Each magazine apparatus 100 is positioned in the cassette 608 utilizing a cassette loader 610. The cassette loader 610 may be a mechanical gripping device, such as a caliper or the like, which is capable of gripping one or more magazine apparatuses at a time. Alternatively, the gripping device may utilize a vacuum system to grip the magazine apparatuses 100. The cassette loader 610 may be coupled to a robotic arm or other, similar device capable of positioning the cassette loader 610 with respect to the cassette 608 and the magazine apparatuses 100. Alternatively, a plurality of magazine apparatuses 100 may be manually stacked, one atop the other, and manually loaded into a cassette. The term cassette, as used herein, refers to a framework into which the stacked magazine apparatuses are loaded into. The cassette generally holds the stacked magazine apparatus together as they proceed through various processing steps, such as ion exchange baths, rinsing, washing, and the like. When multiple magazine apparatuses 100 are loaded into the cassette 608, the magazine apparatuses 100 are positioned such that the ware spacers 168 of the magazine apparatus above are positioned directly over each glass article 300 held in the magazine apparatus below, as depicted in FIG. 8.

In a next step 510, the cassette 608 containing the magazine apparatuses 100 and glass articles 300 is transferred to an ion exchange station and loaded into an ion exchange tank 614 to facilitate chemically strengthening the glass articles 300. The cassette 608 is transferred to the ion exchange station with a cassette transfer device 612. The cassette transfer device 612 may be a mechanical gripping device, such as a caliper or the like, which is capable of gripping the cassette 608. Alternatively, the gripping device may utilize a vacuum system to grip the cassette 608. The cassette transfer device 612 and attached cassette 608 may be automatically conveyed from the cassette loading area to the ion exchange station with an overhead rail system, such as a gantry crane or the like. Alternatively, the cassette transfer device 612 and attached cassette 608 may be conveyed from the cassette loading area to the ion exchange station with a robotic arm. In yet another embodiment, the cassette transfer device 612 and attached cassette 608 may be conveyed from the cassette loading area to the ion exchange station with a conveyor and, thereafter, transferred from the conveyor to the ion exchange tank 614 with a robotic arm or an overhead crane.

Once the cassette transfer device 612 and attached cassette 608 are at the ion exchange station, the cassette 608 and the glass articles 300 contained therein may optionally be preheated prior to submerging the cassette 608 and the glass articles 300 in the ion exchange tank 614. In some embodiments, the cassette 608 may be preheated to a temperature greater than room temperature and less than or equal to the temperature of the molten salt bath in the ion exchange tank. For example, the glass articles may be preheated to a temperature from about 300° C.-500° C. However, it should be understood that the preheating step is optional due to the relatively low thermal mass of the magazine apparatuses 100 described herein.

The ion exchange tank 614 contains a bath of molten salt 616, such as a molten alkali salt, such as $KNO_3$, $NaNO_3$ and/or combinations thereof. In one embodiment, the bath of molten salt is 100% molten $KNO_3$ which is maintained at a temperature greater than or equal to about 350° C. and less than or equal to about 500° C. However, it should be understood that baths of molten alkali salt having various other compositions and/or temperatures may also be used to facilitate ion exchange of the glass articles.

In step 512, the glass articles 300 are ion exchange strengthened in the ion exchange tank 614. Specifically, the glass articles are submerged in the molten salt and held there for a period of time sufficient to achieve the desired compressive stress and depth of layer in the glass articles 300. As the glass articles 300 are submerged, the glass articles initially have positive buoyancy as air escapes from the interior volume of the glass articles and is replaced with molten salt. As the glass articles rise due to the positive buoyancy, the top of glass article comes into contact with the ware spacers 168 of the magazine apparatus above, thereby preventing contact between the bottom surface of the magazine apparatus above and mitigating damage to the glass articles. In addition the open structure of the ware receiving channels 110 allows the molten salt bath to contact all surfaces of the glass articles, improving the uniformity of the compressive stress induced in the surface of the articles.

In one embodiment, the glass articles 300 may be held in the ion exchange tank 614 for a time period sufficient to achieve a depth of layer of up to about 100 μm with a compressive stress of at least about 200 MPa or even 250 MPa. In some embodiments, the glass articles 300 may be held in the ion exchange tank 614 for a time period sufficient to achieve a depth of layer of up to about 100 μm with a compressive stress of at least about 300 MPa or even 350 MPa. The holding period may be less than 30 hours or even less than 20 hours. However it should be understood that the time period with which the glass articles are held in the tank 614 may vary depending on the composition of the glass container, the composition of the bath of molten salt 616, the temperature of the bath of molten salt 616, and the desired depth of layer and the desired compressive stress.

After the glass articles 300 are ion exchange strengthened, the cassette 608 and glass articles 300 are removed from the ion exchange tank 614 using the cassette transfer device 612 in conjunction with a robotic arm or overhead crane. During removal from the ion exchange tank 614, the open structure of the ware receiving channels 110 of the magazine apparatus 100 allows the molten salt within the magazine apparatus to readily drain from each magazine apparatus. After the cassette 608 is removed from the ion exchange tank 614, the cassette 608 and the glass articles 300 are suspended over the ion exchange tank 614 and the cassette 608 is rotated about a horizontal axis such that any molten salt remaining in the glass articles 300 is emptied back into the ion exchange tank 614. As the cassette 608 is rotated, the glass articles 300 slide within the ware receiving channels 110 towards the bottom surface of the magazine apparatus located above. The glass articles 300 are prevented from blunt force contact with the bottom surface of the magazine apparatus located above by the ware spacers 168 of the magazine apparatus located above. The ware spacers 168 act as spring cushions that slow and arrest the sliding motion of the glass articles 300, thereby mitigating damage to the glass articles due to blunt force contact. Thereafter, the cassette 608 is rotated back to its initial position and the glass articles are allowed to cool prior to being rinsed.

The cassette 608 and glass articles 300 are then transferred to a rinse station with the cassette transfer device 612. This transfer may be performed with a robotic arm or overhead crane, as described above, or alternatively, with an automatic conveyor such as a conveyor belt or the like. In a next step 514, the cassette 608 and glass articles 300 are lowered into a rinse tank 618 containing a water bath 620 to remove any excess salt from the surfaces of the glass articles 300. The cassette 608 and glass articles 300 may be lowered into the rinse tank 618 with a robotic arm, overhead crane or similar device which couples to the cassette transfer device 612. The glass articles initially have a positive buoyancy upon being submerged in the rinse tank 618. However, as the glass articles rise, the top of each glass article comes into contact with the ware spacers 168 of the magazine apparatus above, thereby preventing contact between the underside of the magazine apparatus above and mitigating damage to the glass articles.

The cassette 608 and glass articles 300 are then withdrawn from the rinse tank 618. Optionally, the cassette 608 and glass articles 300 may be suspended over the rinse tank 618, and the cassette 608 is rotated about a horizontal axis such that any rinse water remaining in the glass articles 300 is emptied back into the rinse tank 618. As the cassette 608 is rotated, the glass articles 300 slide within the ware receiving channels 110 towards the bottom surface of the magazine apparatus located above. The glass articles 300 are prevented from blunt force contact with the bottom surface of the magazine apparatus located above by the ware spacers 168 of the magazine apparatus located above. The ware spacers 168 act as spring cushions that slow and arrest the sliding motion of the glass articles 300, thereby mitigating damage to the glass articles due to blunt force contact. In some embodiments, the rinsing operation may be performed multiple times before the cassette 608 and glass articles 300 are moved to the next processing station.

In one particular embodiment, the cassette 608 and the glass articles 300 are dipped in a water bath at least twice. For example, the cassette 608 may be dipped in a first water bath and, subsequently, a second, different water bath to ensure that all residual alkali salts are removed from the surface of the glass article. The water from the first water bath may be sent to waste water treatment or to an evaporator.

In a next step 516, the magazine apparatuses 100 are removed from the cassette 608 with the cassette loader 610. Thereafter, in step 518, the glass articles 300 are unloaded from the magazine apparatuses 100 with the magazine loader 602 and transferred to a washing station. In step 520, the glass articles are washed with a jet of de-ionized water 624 emitted from a nozzle 622. The jet of de-ionized water 624 may be mixed with compressed air.

Optionally, in step 521 (not depicted in FIG. 10), the glass articles 300 are transferred to an inspection station where the glass articles are inspected for flaws, debris, discoloration and the like.

It should now be understood that the magazine apparatuses described herein may be used to hold and retain glass article during processing. Forming the magazine apparatus as an array of partially open ware receiving channels with ware spacers positioned beneath the ware receiving channels mitigates the introduction of flaws in the glass articles retained within the magazine apparatus. Forming the magazine apparatus from relatively thin sheets of metallic material reduces the thermal mass of the magazine apparatus which improves ion exchange performance when the magazine apparatuses are used to facilitate strengthening of the glass articles by ion exchange.

While the magazine apparatuses have been shown and described herein being used in conjunction with glass containers, such as glass vials, it should be understood that the magazine apparatuses may be used to hold and retain various other types of glass articles including, without limitation, Vacutainers®, cartridges, syringes, ampoules, bottles, flasks, phials, tubes, beakers, vials or the like, including both round-form glass articles and non-round-form glass articles.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A magazine apparatus for holding and retaining glassware during processing, the magazine apparatus comprising:
a plurality of dividing straps positioned substantially parallel with one another;

a plurality of support straps positioned substantially parallel with one another and intersecting with the plurality of dividing straps to form a plurality of ware receiving channels, an upper end and a lower end of each ware receiving channel being at least partially open;

a plurality of ware seats, each ware seat extending at least partially across a corresponding ware receiving channel proximate a lower end of the corresponding ware receiving channel, wherein each ware seat is positioned in the corresponding ware receiving channel and provides a seat for glassware positioned in the corresponding ware receiving channel; and a plurality of ware spacers, each ware spacer being positioned below and spaced apart from a corresponding ware seat and extending at least partially across the corresponding ware receiving channel.

2. The magazine apparatus of claim 1, wherein each ware spacer is coupled to and spaced apart from the corresponding ware seat with a spacer stem.

3. The magazine apparatus of claim 1, wherein each ware spacer is positioned outside of the corresponding ware receiving channel.

4. The magazine apparatus of claim 1, wherein the plurality of ware seats are elastically deformable.

5. The magazine apparatus of claim 1, wherein the plurality of ware spacers are elastically deformable.

6. The magazine apparatus of claim 1, wherein:
each of the plurality of support straps comprises a plurality of attachment slots;
each of the plurality of dividing straps comprises a plurality of attachment slots;
each of the plurality of dividing straps are engaged with a corresponding attachment slot of each support strap; and
each of the plurality of support straps are engaged with a corresponding attachment slot of each dividing strap.

7. The magazine apparatus of claim 1, further comprising an outer wall extending around the plurality of dividing straps and the plurality of support straps, wherein the plurality of dividing straps and the plurality of support straps are engaged with the outer wall.

8. The magazine apparatus of claim 7, wherein:
the outer wall comprises a plurality of retention slots;
each of the plurality of dividing straps comprises a retention tab;
each of the plurality of support straps comprises a retention tab; and
the retention tab of the plurality of dividing straps and the retention tab of the plurality of support straps are engaged with corresponding retention slots formed of the outer wall.

9. The magazine apparatus of claim 7, wherein the outer wall is formed from a metal strap having a first end and a second end and the first end is joined to the second end.

10. The magazine apparatus of claim 7, wherein the outer wall comprises a plurality of drain apertures extending through a thickness of the outer wall.

11. The magazine apparatus of claim 1, wherein:
each of the plurality of dividing straps comprises a plurality of dimples extending into the plurality of ware receiving channels; and
each of the plurality of support straps comprises a plurality of dimples extending into the plurality of ware receiving channels.

12. The magazine apparatus of claim 1, wherein each of the plurality of ware receiving channels comprises a spring member biased into each of the plurality of ware receiving channels from either a corresponding dividing strap or a corresponding support strap.

13. A magazine apparatus for holding and retaining glassware during processing, the magazine apparatus comprising:
a plurality of dividing straps positioned substantially parallel with one another;
a plurality of support straps positioned substantially parallel with one another and intersecting with the plurality of dividing straps to form a plurality of ware receiving channels, an upper end and a lower end of each ware receiving channel being at least partially open;
an outer wall extending around the plurality of dividing straps and the plurality of support straps, wherein the plurality of dividing straps and the plurality of support straps are engaged with the outer wall;
a plurality of cantilevered ware seats, each cantilevered ware seat is positioned in and extends at least partially across a corresponding ware receiving channel proximate a lower end of the corresponding ware receiving channel, each cantilevered ware seat providing a seat for glassware positioned in the corresponding ware receiving channel; and
a plurality of ware spacers, each ware spacer being positioned below and spaced apart from a corresponding cantilevered ware seat and outside of the corresponding ware receiving channel, each ware spacer extending at least partially across the corresponding ware receiving channel.

14. A magazine apparatus for holding and retaining glassware during processing, the magazine apparatus comprising:
a plurality of dividing straps positioned substantially parallel with one another;
a plurality of support straps positioned substantially parallel with one another and intersecting with the plurality of dividing straps to form a plurality of ware receiving channels, an upper end and a lower end of each ware receiving channel being at least partially open;
a plurality of ware seats, each ware seat extending at least partially across a corresponding ware receiving channel proximate a lower end of the corresponding ware receiving channel, each ware seat providing a seat for glassware positioned in the corresponding ware receiving channel; and
a plurality of ware spacers positioned below and spaced apart from a corresponding ware seat and extending at least partially across the corresponding ware receiving channel, wherein the plurality of ware spacers are elastically deformable.

15. The magazine apparatus of claim 14, wherein each ware spacer is coupled to and spaced apart from the corresponding ware seat with a spacer stem.

16. The magazine apparatus of claim 14, wherein each ware spacer is positioned outside of the corresponding ware receiving channel.

17. The magazine apparatus of claim 14, wherein:
each of the plurality of support straps comprises a plurality of attachment slots;
each of the plurality of dividing straps comprises a plurality of attachment slots;
each of the plurality of dividing straps are engaged with a corresponding attachment slot of each support strap; and
each of the plurality of support straps are engaged with a corresponding attachment slot of each dividing strap.

18. The magazine apparatus of claim 14, further comprising an outer wall extending around the plurality of dividing straps and the plurality of support straps, wherein the plurality of dividing straps and the plurality of support straps are engaged with the outer wall.

19. The magazine apparatus of claim 18, wherein:
the outer wall comprises a plurality of retention slots;
each of the plurality of dividing straps comprises a retention tab;
each of the plurality of support straps comprises a retention tab; and
the retention tab of the plurality of dividing straps and the retention tab of the plurality of support straps are engaged with corresponding retention slots formed of the outer wall.

20. The magazine apparatus of claim 18, wherein the outer wall is formed from a metal strap having a first end and a second end and the first end is joined to the second end.

\* \* \* \* \*

UNITED STATES PATENT AND TRADEMARK OFFICE
CERTIFICATE OF CORRECTION

PATENT NO. : 9,914,200 B2  
APPLICATION NO. : 14/808702  
DATED : March 13, 2018  
INVENTOR(S) : Todd Marshall Wetherill It is certified that error appears in the above-identified patent and that said Letters Patent is hereby corrected as shown below:

On the Title Page

Item (71) Applicant:
Change "Corning Incorporated, Coming, NY (US)" to --Corning Incorporated, Corning, NY (US)--

Signed and Sealed this
Nineteenth Day of June, 2018

Andrei Iancu
*Director of the United States Patent and Trademark Office*